US009187643B2

(12) United States Patent
Benicewicz et al.

(10) Patent No.: US 9,187,643 B2
(45) Date of Patent: Nov. 17, 2015

(54) SILICONE BASED NANOCOMPOSITES INCLUDING INORGANIC NANOPARTICLES AND THEIR METHODS OF MANUFACTURE AND USE

(71) Applicants: Brian C. Benicewicz, Columbia, SC (US); Peng Tao, Troy, NY (US); Ying Li, Troy, NY (US); Linda Schadler Feist, Niskayuna, NY (US); Richard W. Siegel, Troy, NY (US); Anand Viswanath, Columbia, SC (US)

(72) Inventors: Brian C. Benicewicz, Columbia, SC (US); Peng Tao, Troy, NY (US); Ying Li, Troy, NY (US); Linda Schadler Feist, Niskayuna, NY (US); Richard W. Siegel, Troy, NY (US); Anand Viswanath, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 14/359,728

(22) PCT Filed: Nov. 21, 2012

(86) PCT No.: PCT/US2012/066254
§ 371 (c)(1),
(2) Date: May 21, 2014

(87) PCT Pub. No.: WO2013/078309
PCT Pub. Date: May 30, 2013

(65) Prior Publication Data
US 2014/0343233 A1 Nov. 20, 2014

Related U.S. Application Data

(60) Provisional application No. 61/629,534, filed on Nov. 21, 2011.

(51) Int. Cl.
C08L 83/04 (2006.01)
C08K 3/36 (2006.01)
C08L 83/08 (2006.01)
C08G 77/30 (2006.01)

(52) U.S. Cl.
CPC . *C08L 83/04* (2013.01); *C08K 3/36* (2013.01); *C08L 83/08* (2013.01); *C08G 77/30* (2013.01)

(58) Field of Classification Search
CPC ......... C08L 83/04; C08L 83/08; C08G 77/30; C08K 3/36; C08K 2003/2241; C08K 2003/2227
See application file for complete search history.

(56) References Cited

U.S. PATENT DOCUMENTS

2010/0261808 A1 10/2010 Schadler et al.
2012/0039824 A1* 2/2012 Archer et al. ............... 424/59

FOREIGN PATENT DOCUMENTS

WO WO 2011/133228 10/2011

OTHER PUBLICATIONS

International Search Report for corresponding PCT Application No. PCT/US12/66254 dated Feb. 8, 2013, 3 pages.
Yamada et al., "Incorporation of Titanium Dioxide Particles into Polymer Matrix Using Block Copolymer Micelles for Fabrication of High Refractive and Transparent Organic-Inorganic Hybrid Materials", Journal of Polymer Science: Part A: Polymer Chemistry, vol. 49, 2011, 712-718.
Lee et al., "High-Refractive-Index Thin Films Prepared from Trialkoxysilane-Capped Poly(methylmethacrylate)—Titania Materials", Chem. Mater., vol. 13, No. 3, 2001, 1137-1142.
Althues et al., "Functional inorganic nanofillers for transparent polymers", Chem. Soc. Rev. 36, 2007, 1454-1465.
Gast et al., "Effect of Polymer Solutions on Sterically Stabilized Suspensions", vol. 89, No. 19, Sep. 12, 1985, 3947 to 3949.
Borukhov et al., "Enthalpic Stabilization of Brush-Coated Particles in a Polymer Melt", Macromolecules 35, 2002, 5171-5182.
Gast et al., "Interactions of Sterically Stabilized Particles Suspended in a Polymer Solution", Macromolecules 19, 1986, 686-691.
Lee et al., "Refractive index engineering of transparent $ZrO_2$-polydimethylsiloxane nanocomposites", Journal of Materiais Chemistry 18, 2008, 1751-1755.
Demir et al., "In-Situ Bulk Polymerization of Dilute Particle/MMA Dispersions", Macromolecules 40, 2007, 4190-4198.
Zheng et al., "Polystyrene Nanoparticles with Anionically Polymerized Polybutadiene Brushes", Macromolecules 37, 2004, 9954-9962.
Ferreira et al., "Scaling Law for Entropic Effects at Interfaces between Grafted Layers and Polymer Melts", Macromolecules 31, 1998, 3994-4003.
Hasegawa et al., "Optimum Graft Density for Dispersing Particles in Polymer Melts", Macromolecules 29, 1996, 6656-6662.
Matsen et al., "Autophobic dewetting of homopolymer on a brush and entropic attraction between opposing brushes in a homopolymer mix", Journal of Chemical Physics, vol. 115, No. 6, Aug. 8, 2001, 2794-2804.

(Continued)

*Primary Examiner* — Kuo-Liang Peng
(74) *Attorney, Agent, or Firm* — Dority & Manning, P.A.

(57) ABSTRACT

Silicone-based nanocomposites that include a plurality of multimodal nanoparticles dispersed within a silicone-based polymeric matrix are provided. Each of the multimodal nanoparticle has a first plurality of long silicone compatible polymeric chains and a second plurality of short silicone compatible polymeric chains grafted onto a surface of a nanoparticle (e.g., an inorganic nanoparticle, such as silica, alumina, titania, indium tin oxide, CdSe, etc.), with the short silicone compatible polymeric chains present on each multimodal nanoparticle at a higher grafting density than the long silicone compatible polymeric chains. Methods are also provided for forming a silicone-based nanocomposite.

21 Claims, 10 Drawing Sheets

(56) References Cited

OTHER PUBLICATIONS

Pryamtisyn et al., "Modeling the anisotropic self-assembly of spherical polymer-grafted nanoparticies", Journal of Chemical Physics 131, 2009, 221102-1-4.

Yoshikawa et al., "Fabrication of High-Density Polymer Brush on Polymer Substrate by Surface-Initiated Living Radical Polymerization", Macromolecules 38, 2005, 4604-4610.

Ohno et al., "Synthesis of Monodisperse Silica Particles Coated with Well-Defined, High-Density Polymer Brushes by Surface-Initiated Atom Transfer Radical Polymerization", Macromolecules 38, 2005, 2137-2142.

Tao et al., "$TiO_2$ nanocomposites with high refractive index and transparency", Journal of Materials Chemistry 21, 2011, 18623-18629.

Tao et al., "Preparation and Optical Properties of Indium Tin Oxide/ Epoxy Nanocomposites with Polyglycidyl Methacrylate Grafted Nanoparticles", ACS Appl. Mater, Interfaces 3, 2011,3638-3645.

Pan et al., "Facile Synthesis and Characterization of Luminescent $TiO_2$ Nanocrystals", Adv. Mater. 17, 2005, 1991-1995.

White et al., "Toward the Syntheses of Universal Ligands for Metal Oxide Surfaces: Controlling Surface Functionality through Click Chemistry", Chem. Soc. 128, 2006, 11356-11357.

Raghavan et al., "Colloidal Interactions between Particles with Tethered Nonpolar Chains Dispersed in Polar Media: Direct Correlation between Dynamic Rheology and Interaction Parameters", Langmuir 16, 2000, 1066-1077.

Akcora et al., "Anisotropic self-assembly of spherical polymer-grafted nanoparticles", Nature Materials, vol. 8, Apr. 2009, 354-359.

Cho et al., "Comparison of theoretical predictions and experimental values of the dielectric constant of epoxy/$BaTiO_3$ composite embedded capacitor films", Journal of Materials Science: Materials in Electronic 16, 2005, 77-84.

Nair et al., "Effect of bidispersity in grafted chain length on grafted chain conformations and potential of mean force between polymer grafted nanoparticles in a homopolymer matrix", Journal of Chemical Physics 134, 2011, 194906-1-16.

Chevigny et al., "Polymer-Grafted-Nanoparticles Nanocomposites: Dispersion, Grafted Chain of Conformation, and Rheological Behavior", Macromolecules 44, 2011, 122-133.

Sunday et al., "A Phase Diagram for Polymer-Grafted Nanoparticles in Homopolymer Matrices", Macromolecules 45, 2012, 4007-4011.

* cited by examiner

SILICONE BASED NANOCOMPOSITES INCLUDING INORGANIC NANOPARTICLES AND THEIR METHODS OF MANUFACTURE AND USE

PRIORITY INFORMATION

The present application claims priority to U.S. Provisional Patent Application Ser. No. 61/629,534 titled "Transparent Silicone Based Nanocomposites Filled with Inorganic Nanoparticles" of Tao, et al. filed on Nov. 21, 2011, the disclosure of which is incorporated by reference herein.

GOVERNMENT SUPPORT CLAUSE

This invention was made with government support under contracts EEC-0812056 and DMR-0642573 awarded by the National Science Foundation and contract C090145 awarded by NYSTAR. The government has certain rights in the invention.

BACKGROUND

Silicone-based polymers are one of the most important polymer classes, due to their wide applications within automotive, health care, and electronic device packaging industries. Silicone based materials have advantages such as high transparency in the UV-visible region, controlled refractive index, stable thermo-mechanical properties, and tunable hardness from soft gels to hard resins. Compared with pure silicone polymer, enhanced mechanical, thermal, electric, dielectric and optical properties can be realized with silicone based nanocomposites by adding functional inorganic nanoparticles. However, the incompatibility between inorganic nanoparticles and an organic matrix normally leads to large agglomerates of the inorganic nanoparticles within the polymer matrix. Such agglomeration leads to a loss in optical transparency and severely limits the use of these materials in optical applications. This result is especially true for silicone nanocomposites because the surface energy difference between inorganic nanoparticles and silicone is very large, creating an even stronger tendency for inorganic fillers to form agglomerates within a silicone-based polymer matrix, when compared to most other organic polymers.

Conventional methods for improving compatibility and dispersion of nanoparticles within such polymer matrices adopted by other researchers include physical sonication and surface ligand engineering. However, these techniques only result in visibly transparent silicone nanocomposites, when relatively thin films are made using a spin-coating method. The high transparency was mainly attributed to its very small thickness and kinetically trapped well dispersed nanoparticles during the fast spin-coating process. Preparation of thick transparent silicone nanocomposites with relatively high nanoparticle loading is very challenging.

Surface ligand engineering of spherical nanoparticles (NPs) to tailor nanoparticle dispersion is one of the grand challenges limiting our ability to harness the potential of nanofilled polymers. The basic principle behind surface ligand engineering is the need to shield the surface of the NP to reduce van der Waals (vdW) core-core attraction, while optimizing the wettability or entanglement of the matrix with the surface ligands. Neither small molecule modification nor monodisperse grafted polymer brushes, in general, achieve stable NP dispersion in bulk polymer matrices. For example, coupling agents such as silanes or surface ligands with carboxylic, amine or other reactive end groups only provide limited success in improving the NP dispersion within a solvent or in monomers, due to inadequate steric hindrance. For monodisperse (mono-modal) grafted polymer brushes, minimizing enthalpic interaction requires high surface coverage or a high value of $\sigma\sqrt{N}$ with $\sigma$ being the brush graft density, and N the number of mers. At matrix molecular weights of interest for commercial use, the entropic penalty is often too high for matrix entanglement, as predicted by the scaling criterion $\sigma\sqrt{N} > (N/P)^2$ for a polymer matrix with a degree of polymerization P. Instead, "autophobic dewetting" occurs due to the entropic attraction. In order to reduce the entropic penalty and achieve matrix/brush penetration, either the graft density is decreased at a risk of an insufficient screening effect, or a smaller molecular weight matrix is adopted, which is of little technological importance. This balance between the core/core attraction and entropic repulsion has been modeled by Pryamtisyn et al., and qualitative agreement with experimental data has been shown.

As such, a need exists for improved transparent silicone nanocomposites with relatively high nanoparticle loading.

SUMMARY

Objects and advantages of the invention will be set forth in part in the following description, or may be obvious from the description, or may be learned through practice of the invention.

Silicone-based nanocomposites are generally provided that include a plurality of multimodal nanoparticles dispersed within a silicone-based polymeric matrix. Each of the multimodal nanoparticle has a first plurality of long silicone compatible polymeric chains and a second plurality of short silicone compatible polymeric chains grafted onto a surface of a nanoparticle (e.g., an inorganic nanoparticle, such as silica, alumina, titania, indium tin oxide, CdSe, etc.), with the short silicone compatible polymeric chains present on each multimodal nanoparticle at a higher grafting density than the long silicone compatible polymeric chains.

In one embodiment, the multimodal nanoparticles form agglomerations having an average size that is less than about 400 nm (e.g., less than about 40 nm) within the silicone-based polymeric matrix, such that the silicone-based nanocomposite displays a transparency of 90% or more in at least part of the visible spectrum.

The short silicone compatible polymeric chains can include a polydimethylsiloxane chain covalently linked to the surface of the nanoparticle via a phosphorus linkage (e.g., a phosphate linkage and/or a phosphono linkage), and can have a molecular weight of about 2,500 g/mol to about 15,000 g/mol.

Similarly, the long silicone compatible polymeric chains can include a polydimethylsiloxane chain covalently linked to the surface of the nanoparticle via a phosphorus linkage (e.g., a phosphate linkage and/or a phosphono linkage), and can have a molecular weight of about 25,000 g/mol to about 250,000 g/mol.

The long silicone compatible polymeric chains can be linked to the surface of the nanoparticle at one location, at two locations, or at more than two locations (e.g., in the case of the long silicone compatible polymeric chain defining a branched polymeric chain).

Methods are also generally provided for forming a silicone-based nanocomposite. For example, nanoparticles can be dispersed within a solvent containing a surfactant. Then, long silicone compatible polymeric chains can be grafted onto the surfaces of nanoparticles; and short silicone compatible polymeric chains can be grafted onto the surface of nanoparticles. As such, each nanoparticle has a first plurality of the long silicone compatible polymeric chains and a second plurality of short silicone compatible polymeric chains grafted onto its surface to form a multimodal nanoparticle, with the short silicone compatible polymeric chains being present on each multimodal nanoparticle at a higher grafting density than the long silicone compatible polymeric chains. Then, the multimodal nanoparticles can be dispersed within a silicone polymeric matrix to form a silicone-based nanocomposite.

In one embodiment, the long silicone compatible polymeric chains can be grafted onto the surfaces of the nanoparticles prior to the short silicone compatible polymeric chains.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

DEFINITIONS

Figure 1:
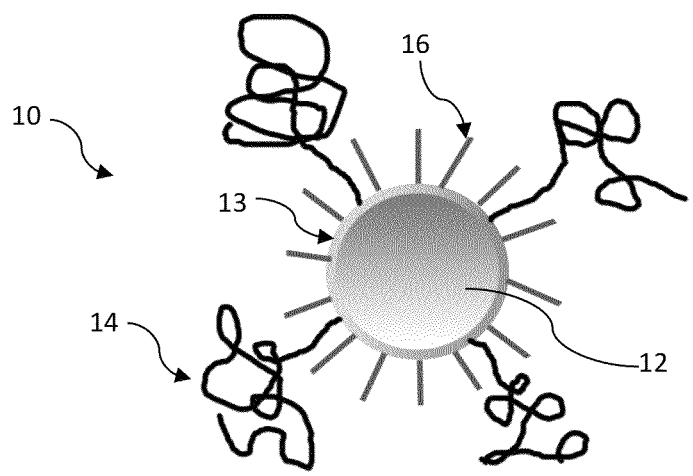
FIG. 1 shows a schematic illustration of an exemplary grafted bimodal polymer chain design for preparation of silicone nanocomposites with good dispersion of nanoparticles.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the prefix "nano" refers to the nanometer scale (e.g., from about 1 nm to about 999 nm). For example, particles having an average diameter on the nanometer scale (e.g., from about 1 nm to about 999 nm) are referred to as "nanoparticles". Particles having an average diameter of greater than 1,000 nm (i.e., 1 μm) are generally referred to as "microparticles", since the micrometer scale generally involves those materials having an average size of greater than 1 μm.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "organic" is used herein to refer to a class of chemical compounds that are comprised of carbon atoms. For example, an "organic polymer" is a polymer that includes carbon atoms in the polymer backbone, but may also include other atoms either in the polymer backbone and/or in side chains extending from the polymer backbone (e.g., oxygen, nitrogen, sulfur, silicon, etc.).

The "weight average molecular weight" ($M_w$) is readily calculated by one of ordinary skill in the art, and generally refers to:

$$\overline{M}_w = \frac{\sum_i N_i M_i^2}{\sum_i N_i M_i}$$

where $N_i$ is the number of molecules of molecular weight $M_i$. The weight average molecular weight can be determined by light scattering, small angle neutron scattering (SANS), X-ray scattering, and sedimentation velocity.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Methods are generally provided to achieve good dispersion of nanoparticles in a silicone polymeric matrix to achieve high optical transparency of the composite materials. The resulting nanocomposites are also generally provided, along with their methods of use. In one particular embodiment, a thermodynamically stable dispersion method is generally provided to enable good dispersion of nanoparticles within the silicone polymeric matrix. The resulting well-dispersed functional silicone based nanocomposites are also generally provided, and have wide optical, optoelectronic and biomedical applications. Thus, the dispersion of inorganic nanoparticles can be tuned within silicone-based polymeric matrices via multimodal (e.g., bimodal) surface ligand engineering according to embodiments of the presently presented methods.

In one embodiment, the bimodal particles include (1) a densely grafted short brush shielding particle surface formed by a first plurality of silicone compatible short organic chains and (2) sparsely grafted long brush interpenetrating with the polymeric matrix formed by a second plurality of long silicone compatible polymeric chains. The silicone compatible short organic changes are present on the inorganic particle at a higher grafting density than the long silicone compatible polymeric chains. Such a bimodal particle essentially provides independent control over the enthalpic and entropic contributions. Without wishing to be bound by any particular theory, it is believed that the densely grafted short brush provides enthalpic screening, while the sparsely grafted long brush suppressing "autophobic dewetting" and encourages entanglement between the brush and the polymeric matrix.

This improved dispersion of nanoparticles within polymeric matrix can be realized by grafting polymer chains with same or similar chemistry as matrix polymer. FIG. 1 shows a general schematic of one particular embodiment of bimodal nanoparticle 10 including an inorganic nanoparticle 12 defining a surface 13. A first plurality of long silicone compatible polymeric chains 14 and a second plurality of short silicone compatible polymeric chains 16 are grafted onto the surface 13 of the inorganic nanoparticle 12 to form the bimodal nanoparticle 10.

As stated, with this approach, both the enthalpic and entropic factors of the interface interaction between inorganic nanoparticle and organic matrix can be manipulated. Compared with monomodal modified particles, grafting chains with a multimodal (e.g., bimodal) design facilitates the modification and enlarges the available range for achieving good dispersion within the polymer matrix. The key to a stable dispersion state is entropic compatibility with the matrix (using low graft density long chains) and enthalpic compatibility with a high graft density of short chains, which shields the core-core attraction of the inorganic nanoparticles. As shown in FIG. 1, long silicone compatible chains 14 and short chains 16 with high grafting density can be attached onto the surfaces 13 of inorganic nanoparticles 12. As demonstrated in the silicone nanocomposite system of the Examples below, the bimodal design is especially effective for dispersing nanoparticles modified with relatively low graft density polymer chains using a simple "grafting to" technique. By designing the grafting parameters of the long and short matrix compatible polymer chains, the dispersion of the nanoparticles and therefore the optical transparency of the composite can be controlled.

Exemplary processes and materials for the preparation of silicone based transparent nanocomposites filled particles possessing bimodal modified matrix compatible chains are described in greater detail below. For example, methods that can be utilized to form a bimodal nanoparticle are described in U.S. patent application Ser. No. 13/569,780 titled "Nanoparticles with Multiple Attached Assemblies and Use Thereof in Polymer Composites" of Benicewicz, et al. filed on Aug. 8, 2012, which is incorporated by reference herein.

I. Nanoparticles

The presently disclosed methods can be utilized on a variety of different types of nanoparticles. The nanoparticle may comprise, for example, natural or synthetic nanoclays (including those made from amorphous or structured clays), inorganic metal oxides, nanolatexes, organic nanoparticles, etc. Particularly suitable nanoparticles include inorganic nanoparticles, such as silica, alumina, titania ($TiO_2$), indium tin oxide (ITO), CdSe, etc., or mixtures thereof. Suitable organic nanoparticles include polymer nanoparticles, carbon, graphite, graphene, carbon nanotubes, virus nanoparticles, etc., or mixtures thereof.

Nanoparticles as used herein means particles (including but not limited to rod-shaped particles, disc-shaped particles, platelet-shaped particles, tetrahedral-shaped particles), fibers, nanotubes, or any other materials having at least one dimension on the nano scale. In one embodiment, the nanoparticles have an average particle size of about 1 to about 1000 nanometers, preferably 2 to about 750 nanometers. That is, the nanoparticles have a dimension (e.g., a diameter and/or length) of about 1 to 1000 nm. Nanotubes can include structures up to 1 centimeter long, alternatively with a particle size from about 2 to about 50 nanometers. Due to their size, nanoparticles have very high surface-to-volume ratios.

The nanoparticles may be crystalline or amorphous. A single type of nanoparticle may be used, or mixtures of different types of nanoparticles may be used. If a mixture of nanoparticles is used they may be homogeneously or non-homogeneously distributed in the composite material or a system or composition containing the composite material. Non-limiting examples of suitable particle size distributions of nanoparticles are those within the range of about 2 nm to less than about 750 nm, alternatively from about 2 nm to less than about 200 nm, and alternatively from about 2 nm to less than about 150 nm.

It should also be understood that certain particle size distributions may be useful to provide certain benefits, and other ranges of particle size distributions may be useful to provide other benefits (for instance, color enhancement requires a different particle size range than the other properties). The average particle size of a batch of nanoparticles may differ from the particle size distribution of those nanoparticles. For example, a layered synthetic silicate can have an average particle size of about 25 nanometers while its particle size distribution can generally vary between about 10 nm to about 40 nm.

In one embodiment, the nanoparticles can be exfoliated from a starting material to form the nanoparticles. Such starting material may have an average size of up to about 50 microns (50,000 nanometers). In another embodiment, the nanoparticles can be grown to the desired average particle size.

In one particular embodiment, the inorganic nanoparticles can be dispersed in a solvent, and their surfaces covered with a weakly bonded ligand, such as oleic acid, a surfactant with a carboxylic acid group (e.g., a long-chain organic acid), or other surfactants. For example, the surfactant can form a weak, non-covalent bond with the surface via van-der-Waals forces, hydrogen bonding, etc. Particularly suitable surfactants include, but are not limited to, oleic acid, lauric acid, palmitic acid, stearic acid, hexyl phosphonic acid, octylphosphonic acid, trioctyl phosphine oxide (TOPO), 1-butanol, tributyl phosphine and oleyl phosphine, oleyl amine, pentyl, hexyl, cyclohexyl, heptyl, octyl, nonyl, decyl carboxylic acid, acrylic acids, and combinations thereof.

II. Attaching Silicone Compatible Organic Chains to the Nanoparticle

Then, silicone matrix compatible polymer chains (both long and short) can be grafted onto the nanoparticle via a phosphorus linkage (e.g., phosphate linkage or a phosphono linkage). In one particular embodiment, the long silicone compatible polymeric chains are grafted to the surface of the nanoparticles prior to the short silicone compatible polymeric chains. Both the long silicone compatible polymeric chain and the short silicone compatible polymeric chain include, in one embodiment, a silicone-oxide polymeric chain (e.g., —[Si—O]—). For example, the long silicone compatible polymeric chains and short chains shown in FIG. 3a, 3b, 3c includes a polymeric chain of repeating dimethylsilicone monomers.

Figure 3A:
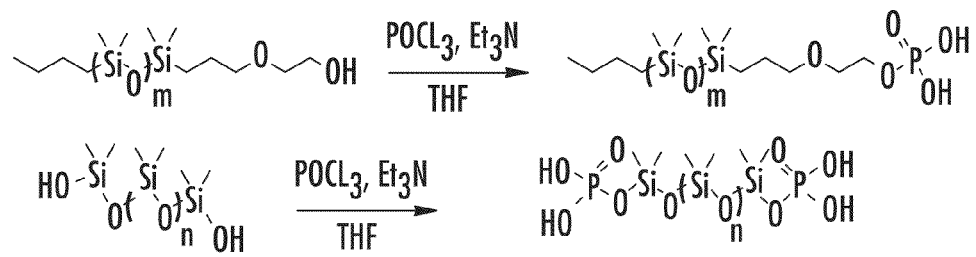
FIGS. 3a-3c show a schematic illustration of one exemplary grafting process and bimodal design of grafted silicone compatible chains on inorganic nanoparticle surfaces.
Figure 3B:
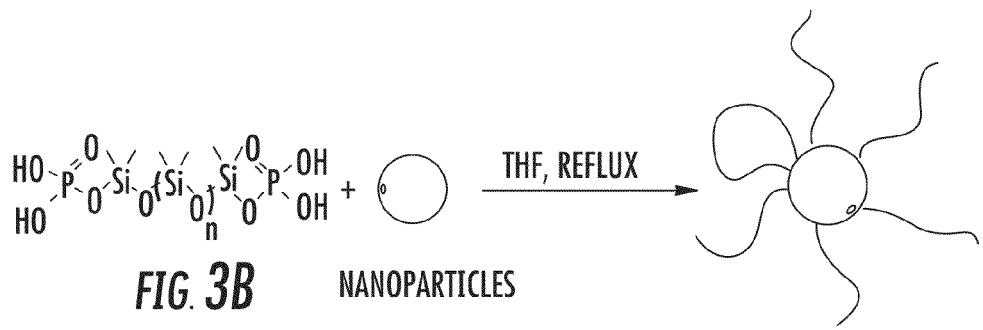
Figure 3C:
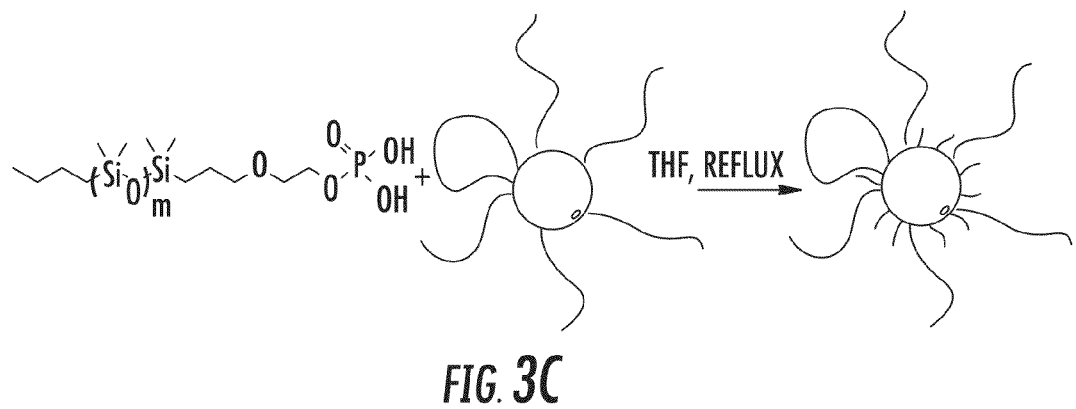

The grafting of matrix compatible chains can be realized either by the exemplary "grafting to" technique as shown in FIG. 3b, 3c or by the "grafting from" technique. In the "grafting to" process, the strongly binding phosphorus functional group (e.g., phosphate group or a phosphono group) on the polymer chain replaces the original surface ligand. In the "grafting from" process, the phosphorus functional group (e.g., phosphate group or a phosphono group) anchors the polymerization initiator onto the nanoparticle surface and then polymer chains are grown from the surface. Both of these processes are discussed in greater detail below.

The phosphorus functional group (e.g., phosphate group or a phosphono group) can be covalently bonded to a single polymeric chain (either branched or unbranched and/or either mono-functional, di-functional, tri-functional, etc.), which can be generally represented by R—PO(OH)$_2$ for a phosphono group or R—O—PO(OH)$_2$ for a phosphate group where R represents a polymeric chain (e.g., either long and short).

Alternatively, the phosphorus functional group can be attached to two polymeric chains, while still allowing for a covalent bond to be formed to the particle via the —OH group. For example, phosphorus functional group can be attached to two polymeric chains according to the representative schematic below:

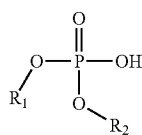

where $R_1$ and $R_2$ represent independent polymeric chains (e.g., either long and short). As such, in one particular embodiment, a single attachment point can covalently bond both a long silicone compatible polymeric chain (e.g., $R_1$) and a short silicone compatible polymeric chain (e.g., $R_2$) to the surface of the nanoparticle. Alternatively, a single attachment point can covalently bond two long silicone compatible polymeric chains or two short silicone compatible polymeric chains to the surface of the nanoparticle.

The same or different technique can be utilized graft the long and short silicone compatible polymeric chains sequentially onto the surface of the nanoparticles. That is, both of the long and short silicone compatible polymeric chains can be "grafted-to" the nanoparticle, as shown in FIGS. 3a-3c. Alternatively, one or both of the silicone compatible polymeric chains can be "grafted-from" the nanoparticle.

No matter the technique(s) utilized to attach the long and short silicone compatible polymeric chains, the short silicone compatible polymeric chains are present on each bimodal nanoparticle at a higher grafting density than the long silicone compatible polymeric chains. For example, the short silicone compatible polymeric chains can be present on each bimodal nanoparticle at a grafting density that is about 0.05 chain/nm$^2$ or more (e.g., about 0.1 chain/nm$^2$ or more), while the long silicone compatible polymeric chains are present on each bimodal nanoparticle at a grafting density that is about 0.05 chain/nm$^2$ or less (e.g., about 0.01 chain/nm$^2$ or less).

As used herein the grafting density (a) is stated in terms of chain density (chain/nm$^2$) calculated from the corresponding weight loss ratio determined by thermal gravimetric analysis (TGA), the number of grafting chains, and surface area of nanoparticles using:

$$\sigma = (wN_A/M_n)/(4\pi a^2 n) = a\rho z N_A \times 10^{-21}/3(1-z)M_n$$

where w is the weight of organic polymers, $N_A$ is Avogadro's number, n is the number of nanoparticles, and z is the weight loss of polymer chains.

A. "Grafting-to" Methods

In one embodiment, the long silicone compatible polymeric chains can be first polymerized and subsequently grafted to the surface of the nanoparticle (e.g., via a covalent bond), either directly or via a first anchoring compound (and, if present, a first functionalization compound). Thus, in this embodiment, the long silicone compatible polymeric chains have been polymerized prior to attachment to the first anchoring compound. Then, the short silicone compatible polymeric chains having a phosphate linker can be grafted onto the nanoparticle (either by the exemplary "grafting to" technique as shown in FIG. 3c or by the "grafting from" technique wherein the strongly binding phosphate group on the grafted polymer chain replaces the original surface ligand or a "grafting from" process where the phosphate group anchors the polymerization initiator onto the nanoparticle surface and then polymer chains are grown from the surface).

In "grafting-to" processes, the silicone compatible polymeric chains are not limited to the type of polymerization and/or types of monomer(s) capable of being polymerized directly to the first anchoring compound. That is, as long as the silicone compatible polymeric chains defines a functional group that can react and bond to the first anchoring compound, any polymeric chain can be bonded to the nanoparticle.

As represented in the exemplary embodiment of FIG. 3b, a long silicone compatible polymeric chain having a phosphoric acid functional group can be grafted directly to the surface of the nanoparticle to covalently bond the long silicone compatible polymeric chain to the surface via the phosphoric acid functional group. Thus, in the broadest terms, each of the long silicone compatible polymeric chain and the short silicone compatible polymeric chain include a polydimethylsiloxane chain linked to a phosphate group (e.g., as phosphoric acid functional group) when attached via a "grafting-to" process.

In one embodiment, the long silicone compatible polymeric chain can include a polymeric chain represented by the formula:

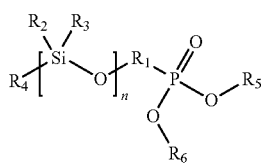

where:

n is the number of repeating monomers in the long silicone compatible polymeric chain (e.g., greater than about 2,000);

$R_1$ is a covalent bond (i.e., the oxygen atom of the repeating unit is bonded directly to the phosphorous atom of the phosphoric acid functional group), an oxygen linkage, any suitable organic linkage (e.g., a polyolefin, including polyethylene, polypropylene, etc.; an ester linkage; an ether linkage, including a polyethylene glycol, a polypropylene glycol, etc.), any suitable amine linkage, or any suitable sulfide linkage;

$R_2$ and $R_3$ are, independently, H; an organic group, such as an alkane group (e.g., having from 1 to about 6 carbons, such as —$CH_3$, —$C_2H_5$, etc.), an alkene group, an aromatic group; or an amine group;

$R_4$ is a functional or non-functional end group, allowing the polymeric chain to be mono-functional (i.e., $R_4$ defines a non-functional end group, such as a alkane group), or di-functional (i.e., $R_4$ defines a functional end group, such as a phosphoric acid functional group); and $R_5$ and $R_6$ are, independently, H or an organic group, such as an alkane group (e.g., having from 1 to about 6 carbons, such as —$CH_3$, —$C_2H_5$, etc.), an alkene group (e.g., having from 1 to about 6 carbons), or an aromatic group.

For example, the long silicone compatible polymeric chain can include a di-functional polymeric chain represented by the formula:

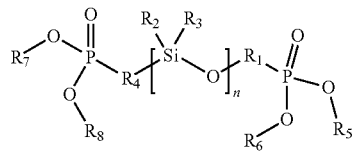

where:

n is the number of repeating monomers in the long silicone compatible polymeric chain (e.g., greater than about 2,000);

$R_1$ and $R_4$ are, independently, a covalent bond (e.g., the oxygen atom of the repeating unit is bonded directly to the phosphorous atom of the phosphoric acid functional group for $R_1$), an oxygen linkage, any suitable organic linkage (e.g., a polyolefin, including polyethylene, polypropylene, etc.; an ester linkage; an ether linkage, including a polyethylene glycol, a polypropylene glycol, etc.), any suitable amine linkage, or any suitable sulfide linkage; and $R_2$ and $R_3$ are, independently, H; an organic group, such as an alkane group (e.g., $CH_3$, $C_2H_5$, etc.), an alkene group, or an aromatic group; or an amine group; and $R_5$, $R_6$, $R_7$, and $R_8$ are, independently, H or an organic group, such as an alkane group (e.g., having from 1 to about 6 carbons, such as —$CH_3$, —$C_2H_5$, etc.), an alkene group (e.g., having from 1 to about 6 carbons), or an aromatic group.

In such a di-functional embodiment, the long silicone compatible polymeric chains can be linked to the surface of the nanoparticle at two locations (via the phosphate group).

In additional embodiments, the long silicone compatible polymeric chains can include branched polymer chains, such that more than two polymeric chains define ends of the molecule. In such an embodiment, more than two attachment groups (e.g, more than two phosphoric acid functional groups) can be present on the long silicone compatible polymeric chain for linking to the surface of the nanoparticle at more than two locations. That is, multiple grafting points (e.g., more than two) for the long silicone compatible polymeric chains can be achieved in this embodiment.

Similarly, as represented in the exemplary embodiment of FIG. 3c, a short silicone compatible polymeric chain having a phosphoric acid functional group can be grafted directly to the surface of the nanoparticle to covalently bond the short silicone compatible polymeric chain to the surface via the phosphoric acid functional group. The short silicone compatible polymeric chain can include any polymeric chain represented by the formulas shown above with respect to the long silicone compatible polymeric chain having mono-functionality (i.e., $R_4$ defines a non-functional end group, such as an alkane group), with m substituted for n. For example, the short silicone compatible polymeric chain can be represented by the formula:

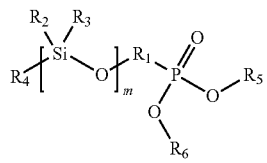

where:

m is the number of repeating monomers in the short silicone compatible polymeric chain (e.g., about 250 to about 20,000, such as about 500 to about 10,000; as long as m is less than n);

$R_1$ is a covalent bond (i.e., the oxygen atom of the repeating unit is bonded directly to the phosphorous atom of the phosphoric acid functional group), an oxygen linkage, any suitable organic linkage (e.g., a polyolefin, including polyethylene, polypropylene, etc.; an ester linkage; an ether linkage, including a polyethylene glycol, a polypropylene glycol, etc.), any suitable amine linkage, or any suitable sulfide linkage;

$R_2$ and $R_3$ are, independently, H; an organic group, such as an alkane group (e.g., $CH_3$, $C_2H_5$, etc.), an alkene group, or an aromatic group; or an amine group;

$R_4$ is a non-functional end group, such as an alkane group (e.g., a methyl group, an ethyl group, a propyl group, a butyl group, etc.); and $R_5$ and $R_6$ are, independently, H, an organic group, such as an alkane group (e.g., having from 1 to about 6 carbons, such as —$CH_3$, —$C_2H_5$, etc.), an alkene group (e.g., having from 1 to about 6 carbons), or an aromatic group.

For example, FIGS. 3a, 3c show one particular embodiment of a short silicone compatible polymeric chain where $R_1$ is an organic group (more particularly, an ether group), $R_2$ and $R_3$ are methyl groups, $R_4$ is a butyl group, and $R_5$ and $R_6$ are both H.

The value of n (i.e., the number of repeating monomers) in the long silicone compatible polymeric chain can be relatively large when compared to the number of repeating monomers in the short silicone compatible polymeric chains (i.e., "m" discussed below and shown in FIG. 3a, 3c). For example, the average value of n (i.e., the number of repeating monomers in the long silicone compatible polymeric chain) can be at least about twice the average value of m (i.e., the number of repeating monomers in the short silicone compatible polymeric chains), such as at least about 10 times the average value of m. In one embodiment, the average value of m (i.e., the number of repeating monomers in the short silicone compatible polymeric chain) can be about 500 to about 1000.

In terms of weight average molecular weight, the short silicone compatible polymeric chain can, in certain embodiments, have a molecular weight of about 2,500 g/mol to about 25,000 g/mol (e.g., about 5,000 g/mol to about 15,000 g/mol). Alternatively, the long silicone compatible polymeric chain can, in certain embodiments, have a molecular weight of about 25,000 g/mol to about 250,000 g/mol (e.g., about 30,000 g/mol to about 150,000 g/mol).

As stated above, the phosphorus functional group can be attached to two polymeric chains, while still allowing for a covalent bond to be formed to the particle via the —OH group. For example, phosphorus functional group can be attached to two polymeric chains according to the representative schematic below:

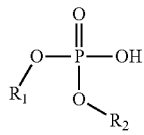

where $R_1$ and $R_2$ represent independent polymeric chains (e.g., either long and short). As such, in one particular embodiment, a single attachment point can covalently bond both a long silicone compatible polymeric chain (e.g., $R_1$) and a short silicone compatible polymeric chain (e.g., $R_2$) to the surface of the nanoparticle. Alternatively, a single attachment point can covalently bond two long silicone compatible polymeric chains or two short silicone compatible polymeric chains to the surface of the nanoparticle.

For example, in one particular embodiment, the phosphorus functional group can be attached to two polymeric chains according to the representative schematic below:

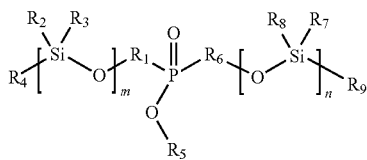

where
$R_1$ and $R_6$ are, independently, a covalent bond (i.e., the oxygen atom of the repeating unit is bonded directly to the phosphorous atom of the phosphoric acid functional group), an oxygen linkage, any suitable organic linkage (e.g., a polyolefin, including polyethylene, polypropylene, etc.; an ester linkage; an ether linkage, including a polyethylene glycol, a polypropylene glycol, etc.), any suitable amine linkage, or any suitable sulfide linkage;

$R_2$, $R_3$, $R_7$, and $R_8$ are, independently, H; an organic group, such as an alkane group (e.g., having from 1 to about 6 carbons, such as —$CH_3$, —$C_2H_5$, etc.), an alkene group, an aromatic group; or an amine group;

$R_4$ and $R_9$ are, independently, a functional or non-functional end group, allowing the polymeric chain to be monofunctional (i.e., $R_4$ and $R_9$ define a non-functional end group, such as a alkane group), or multi-functional (i.e., $R_4$ and/or $R_9$ defines a functional end group, such as a phosphoric acid functional group);

$R_5$ is H or an organic group, such as an alkane group (e.g., having from 1 to about 6 carbons, such as —$CH_3$, —$C_2H_5$, etc.), an alkene group (e.g., having from 1 to about 6 carbons), or an aromatic group;

n is the number of repeating monomers in the long silicone compatible polymeric chain (e.g., greater than about 2,000); and m is the number of repeating monomers in the short silicone compatible polymeric chain (i.e., m is less than n).

B. "Grafting-from" Methods

In one embodiment, the long silicone compatible polymeric chains can be formed by polymerizing a first plurality of first monomers on the first anchoring compound, resulting in the first polymeric chain being covalently bonded to the nanoparticle via the first anchoring compound. According to this method, the polymerization of the first polymeric chain can be conducted through any suitable type of polymerization, such as RAFT polymerization, ATRP, etc.

The particular types of monomer(s) and/or polymerization technique can be selected based upon the desired polymeric chain to be formed. For example, for RAFT polymerization, monomers containing acrylate, methacrylate groups, acrylamides, styrenics, etc., are particularly suitable for formation of the first polymeric chain.

Thus, the "grafting-from" method involves formation of the first polymeric chain onto the first anchoring compound and results in the first polymeric chain being covalently bonded to the nanoparticle via the first anchoring compound (and, if present, a first functionalization compound).

This "grafting-from" process can then be repeated to attach the short silicone compatible polymeric chains to the surface of the nanoparticles.

III. Dispersing the Multimodal Nanoparticles within a Silicone Polymeric Matrix

Finally, the nanoparticle modified with multimodal matrix compatible chains are mixed with a silicone polymeric matrix and processed into silicone based nanocomposites. The silicone material may include, but is not limited to, polydialkylsiloxanes using precursors such as dimethylsiloxane, diethylsiloxanes, methylpropylsiloxane etc. Particularly, siloxane matrices of interest are di-vinyl terminated polysiloxanes capable of crosslinking, such as divinyl polydimethoxysiloxane, diphenylsiloxane-dimethylsiloxane copolymers, polyphenylmethylsiloxane, diethylsiloxane-dimethylsiloxane copolymers. Matrices can also include but are not limited to mono-vinyl siloxanes such as vinylmethylsiloxane-dimethylsiloxane copolymers and vinyl gums and resins. Additionally, two part silicone elastomers, such as Sylgard 184 available from Dow Corning Corp. (Midland, Mich.), can also be applied as matrix components.

Mixing can be accomplished by simple mixing of the components when at least one of the components is a liquid, or by dissolving the components in a solvent for the components and removing the solvent at a later time.

Within the transparent silicone-based nanocomposite, the multimodal nanoparticles are inhibited from substantial agglomeration due to the interaction of the organic chains with each other (particularly the short chains) and with the polymeric matrix (particularly the long chains). For example, the average size of any agglomerations formed by the multimodal inorganic nanoparticles within silicone polymeric matrix can be less than one-tenth of the visible light wavelength (e.g., having a wavelength of about 400 nm to about 800 nm). That is, the multimodal inorganic nanoparticles form, in one embodiment, agglomerations having an average size that is less than about 400 nm, such as less than about 40 nm. Therefore, high optical transparency in the visible light range can be maintained, even in a relatively thick silicone based nanocomposites. For example, the transparent silicone-based nanocomposite can display a transparency to light in the visible spectrum of 90% or more.

The multimodal nanoparticles can be loaded within matrix in an amount up to about 40 wt. % (e.g., about 5 wt. % to about 35 wt. %) of the total weight of the resulting nanocomposite. Even at relatively high loading (e.g., about 25 wt. % to about 30 wt. % or up to about 40 wt. %), the nanocomposite can retain its transparency.

EXAMPLES

A methodology was created for dispersion predictions of metal oxide nanoparticles in polymers, which are validated by both monodisperse and bimodal brushes experimental results. As an application example, thick transparent high refractive index $TiO_2$/silicone nanocomposites were prepared successfully.

A light emitting diode (LED) encapsulation material was used as an example demonstrating the application of transparent silicone based nanocomposite materials. Silicone was chosen as a more advanced LED encapsulant material compared to the traditional epoxy material. Even though the refractive index of silicone can be tuned from 1.38 up to 1.5 by modifying the chemical structure of silicone molecules, higher refractive index transparent silicone based materials are highly desirable since high refractive index LED encapsulant materials (up to the refractive index of the active materials) have been shown to increase the light extraction efficiency of LEDs by a factor of 2. Incorporation of high refractive index inorganic nanoparticles is an effective way to increase the refractive index of the prepared composite material. $TiO_2$/silicone nanocomposites were used as an example to show that high refractive index and highly transparent silicone nanocomposites can be successfully prepared. Furthermore CdSe quantum dot (QD)/silicone nanocomposites were used as an example to demonstrate that highly transparent and luminescent light conversion materials can be prepared, which also have important application in LED packaging. Currently, most of the white light emitting diodes (LEDs) were realized by down conversion of short wavelength sources (near UV or blue chip) with long wavelength light conversion materials known as phosphors. Traditional micro-size inorganic LED phosphor materials suffer from problems such as poor dispersion in encapsulation polymers, strong scattering loss and low color rendering index. The transparent and luminescent CdSe-QD/silicone nanocomposite would yield LED with higher light conversion efficiency and improved color rending capability. Furthermore, the methods disclosed herein can be utilized to disperse other functional nanomaterials in a silicone matrix to prepare transparent silicone based nanocomposites for different applications.

Example 1

Figure 14:
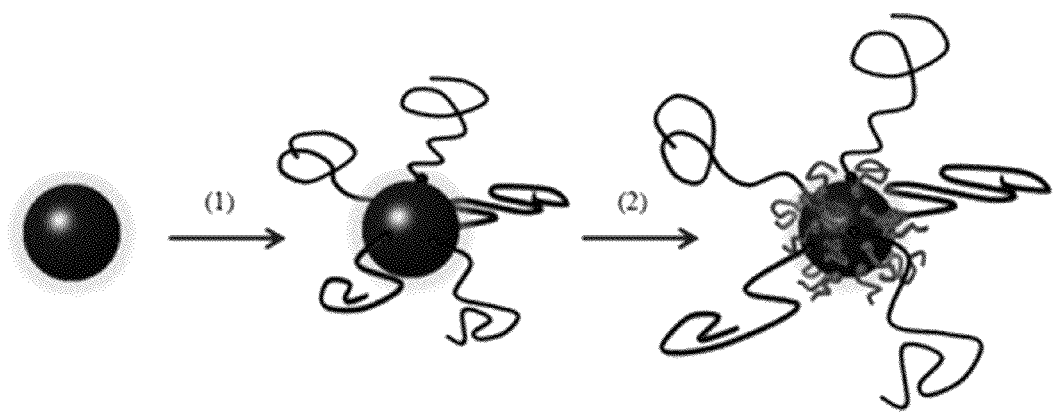
FIG. 14 shows an exemplary two step schematic of a "grafting-to" approach for converting an inorganic nanoparticle to a bimodal nanoparticle.

Due to interest in polydimethylsiloxane (PDMS) grafted $TiO_2$/Silicone nanocomposites for use as high index of refraction (RI) encapsulate materials for LEDs, $TiO_2$/Silicone was used as a model system. The strong $TiO_2$ core-core vdW attraction in high molecular weight commercial silicone matrices has prevented successful preparation of such materials. Instead of the sophisticated "grafting from" approach, a simple "grafting to" method was used, as shown in FIG. 14), which is a convenient route to introduce end-functionalized polymer chains onto NP surfaces. Thick (about 5 mm) transparent relatively high RI nanocomposites were successfully prepared.

Figure 2A:
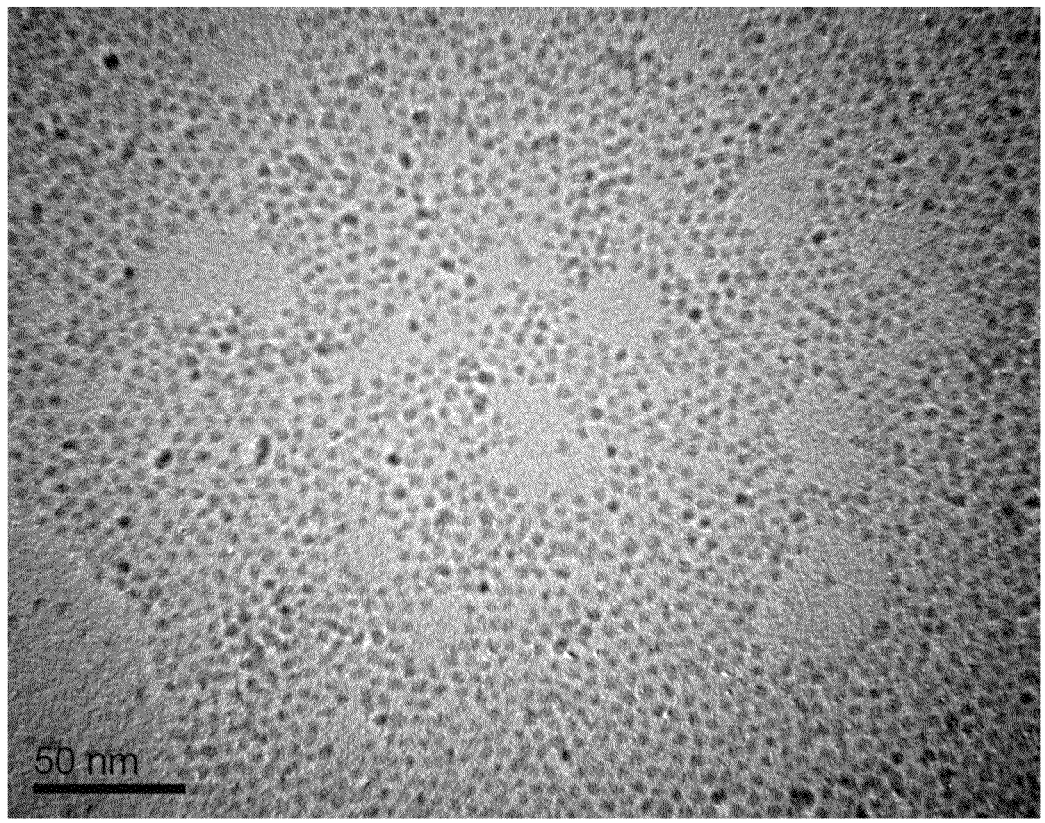
FIG. 2 shows TEM image of as-synthesized $TiO_2$ nanoparticles, the left image showing $TiO_2$ nanoparticles with an average diameter of about 5 nm; and the right showing $TiO_2$ nanoparticles with an average diameter of about 10 nm.
Figure 2B:
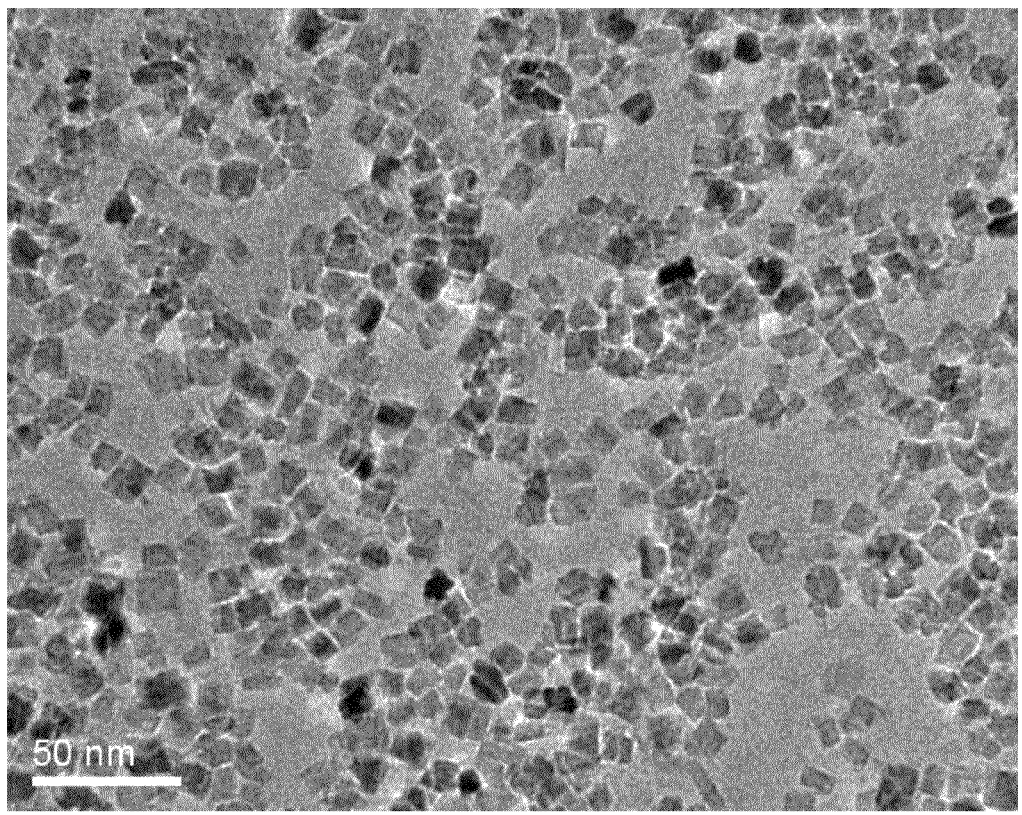
Figure 4:
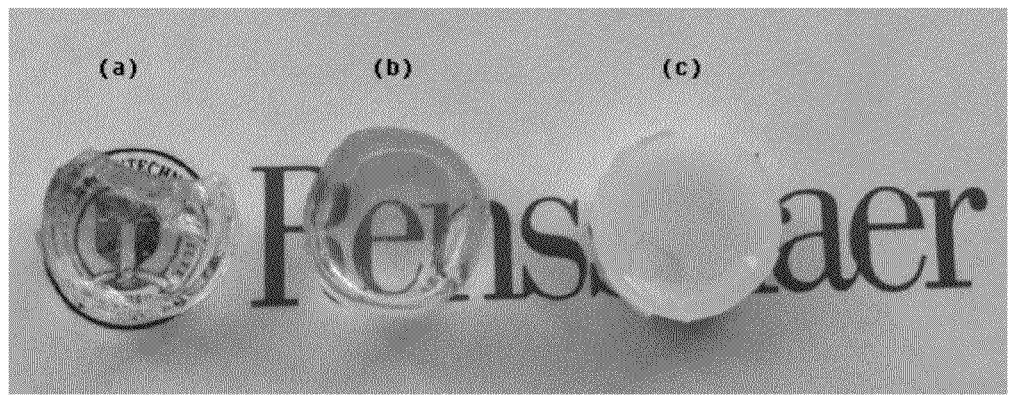
FIG. 4 shows a digital photograph of 5 mm thick (a) pure silicone; (b) $TiO_2$/silicone nanocomposites with 10 wt % bimodal modified $TiO_2$ particles; and (c) $TiO_2$/silicone nanocomposites with 5 wt % monomodal modified $TiO_2$ particles.

Transparent high refractive index $TiO_2$/silicone nanocomposites. $TiO_2$ nanoparticles (5 nm and 10 nm in diameter) were synthesized with a solvothermal reaction. FIGS. 2$a$, 2$b$ show TEM images of homogeneously distributed, near monodisperse $TiO_2$ nanoparticles. The synthesized particle surfaces were covered with a weakly bonded ligand such as oleic acid, a surfactant with carboxylic acid group or other weakly bonding group. The synthesized $TiO_2$ nanoparticles were then subjected to attachment of silicone compatible polymer chains. FIGS. 3$a$-3$c$ shows an exemplary scheme of (a) the preparation of silicone compatible grafted polymer chains, (b) the grafting process, and (c) the final grafted particle structure. The grafted long and short matrix compatible polydimethylsiloxane (PDMS) chains have a phosphate head group, which can replace the original capping ligands on the synthesized $TiO_2$ particle surfaces. The matrix compatible polymer chain grafted particles were then mixed with a silicone matrix to make $TiO_2$/silicone nanocomposites. The digital photographs in FIG. 4 compare 5 mm thick (a) pure silicone, (b) $TiO_2$/silicone nanocomposites with bimodal modified particles, and (c) $TiO_2$/silicone nanocomposites with monomodal modified particles. The composites filled with monomodal modified particles (i.e., labeled (c) in FIG. 4) completely lost their transparency even at lower concentrations of $TiO_2$ particles. By contrast, the silicone nanocomposites containing bimodal grafted particles showed similar transparency to pure silicone.

Figure 5:
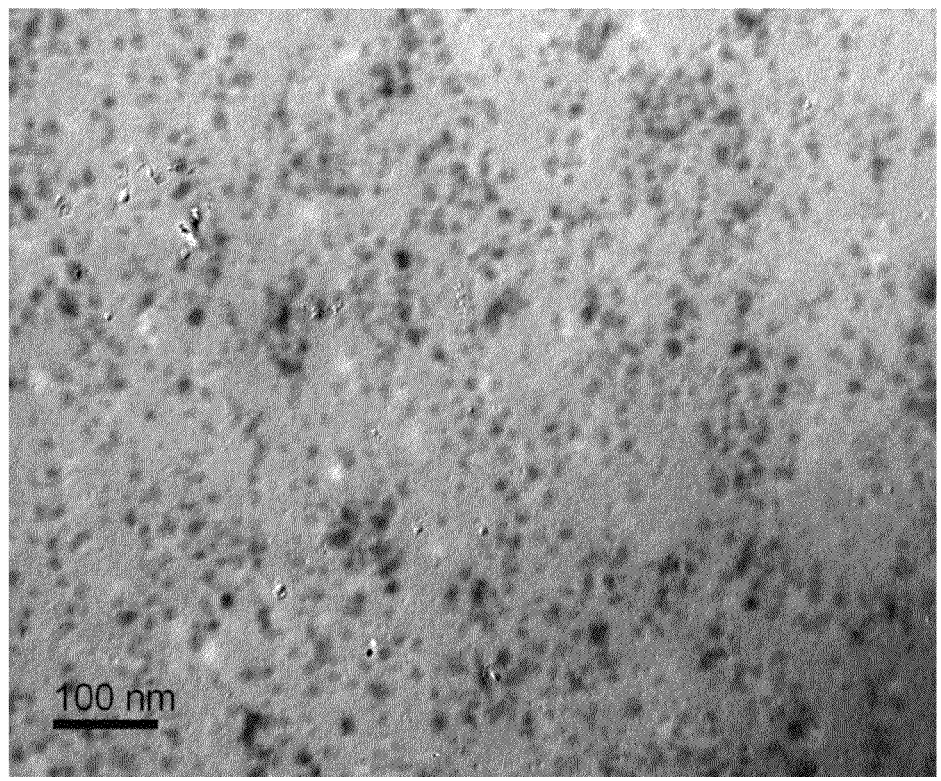
FIG. 5 shows a TEM image showing good dispersion of bimodal PDMS chain grafted 10 nm $TiO_2$ nanoparticles in silicone matrix at 30 wt % loading.
Figure 6:
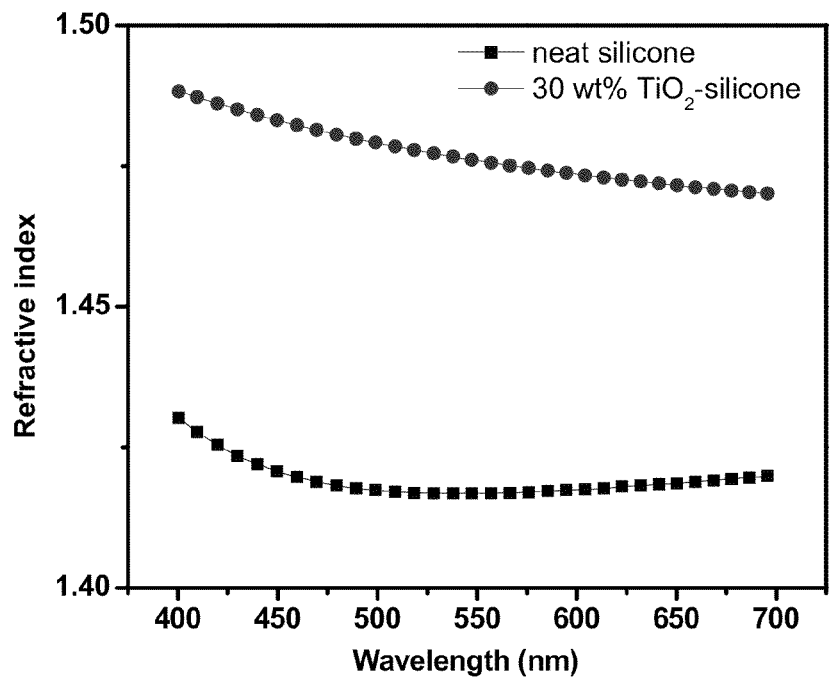
FIG. 6 shows a plot of the refractive index dispersion of pure silicone and 30 wt % bimodal grafted PDMS chain modified $TiO_2$/silicone nanocomposites.
Figure 7:
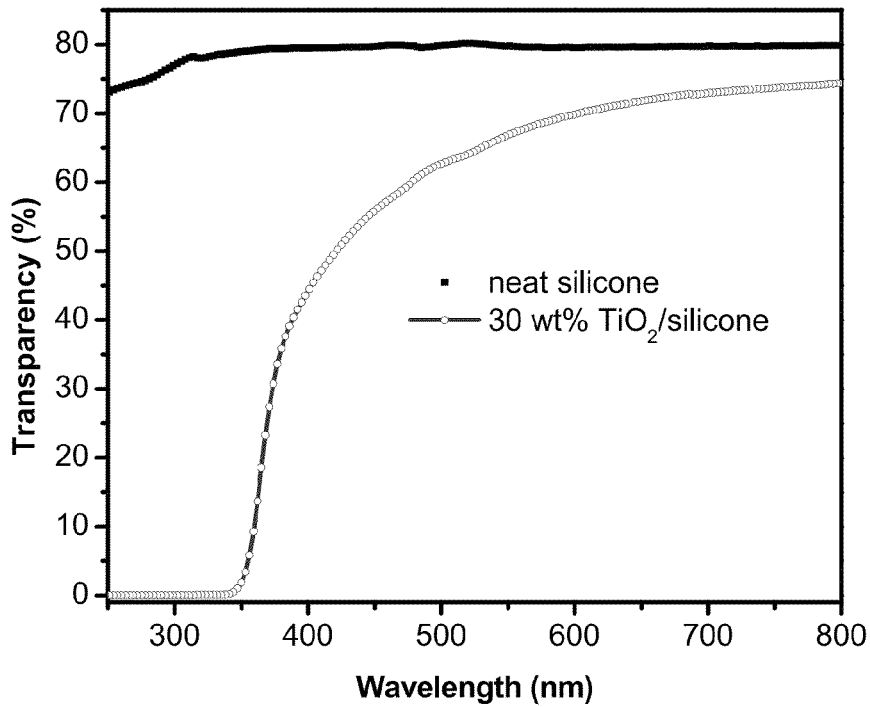
FIG. 7 shows the transmittance spectra of pure silicone and 30 wt % $TiO_2$/silicone nanocomposites prepared according to one embodiment of the present invention (at 0.5 mm thick).
Figure 8:
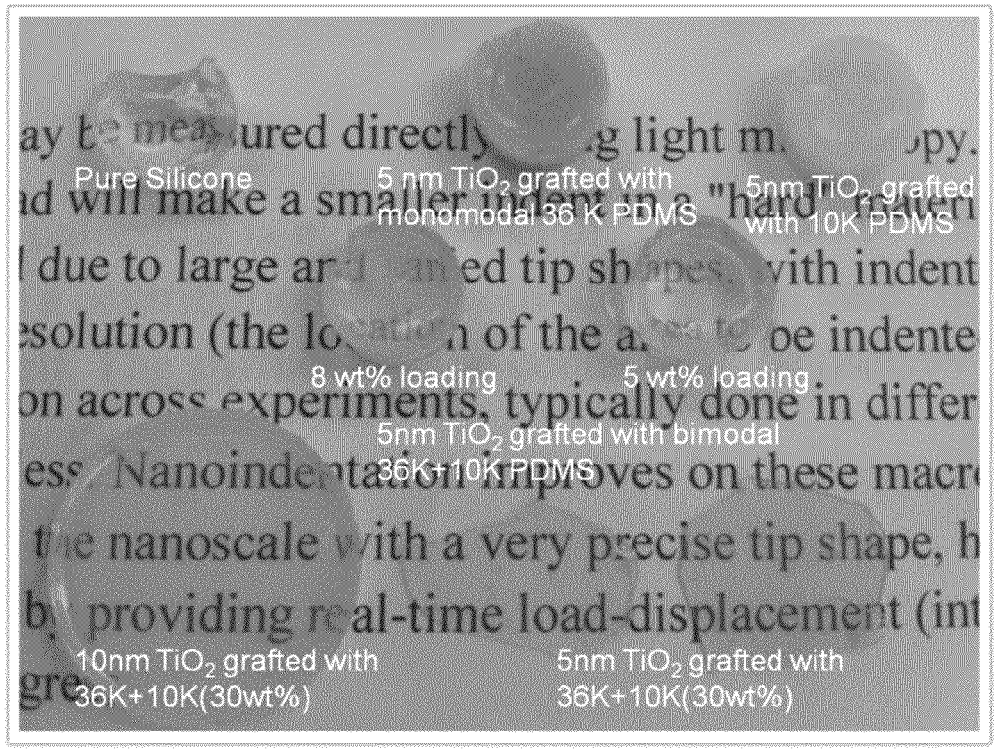
FIG. 8 shows a digital photograph of $TiO_2$/silicone nanocomposites prepared with different matrix compatible PDMS chain grafting designs.

The TEM image in FIG. 5 proves that homogeneous dispersion of $TiO_2$ nanoparticles within the silicone matrix was achieved with PDMS chain grafted particles. The grafted polymer chains prevented the formation of large agglomerates and hence minimized the scattering loss of optical transparency. The good dispersion of $TiO_2$ nanoparticles due to the increased compatibility between PDMS chain grafted particles with silicone matrix explains the high optical transparency of the prepared composites. FIG. 6 displays the increase in refractive index ($\Delta n \approx 0.06$) for silicone as a result of incorporation of 30 wt % high refractive index $TiO_2$ nanoparticles. FIG. 7 compares the UV-vis spectra of neat silicone and the prepared $TiO_2$/silicone nanocomposites. High optical transparency in the visible range was maintained and strong absorption of UV light was observed in $TiO_2$/silicone nanocomposites. The nanocomposites filled with 30 wt % grafted bimodal modified $TiO_2$ particles showed a 90% transparency of the neat silicone in the long wavelength visible range and fully blocked the ultraviolet light below 350 nm. FIG. 8 shows the high refractive index $TiO_2$/silicone composites prepared with different grafted PDMS chain design. Obviously, the composites filled with bimodal modified $TiO_2$ particles showed good optical transparency. Simple mixing of bare $TiO_2$ particles with silicone matrix or $TiO_2$ particles modified with monomodal PDMS chains results in translucent or opaque composites.

Example 2

Figure 9:
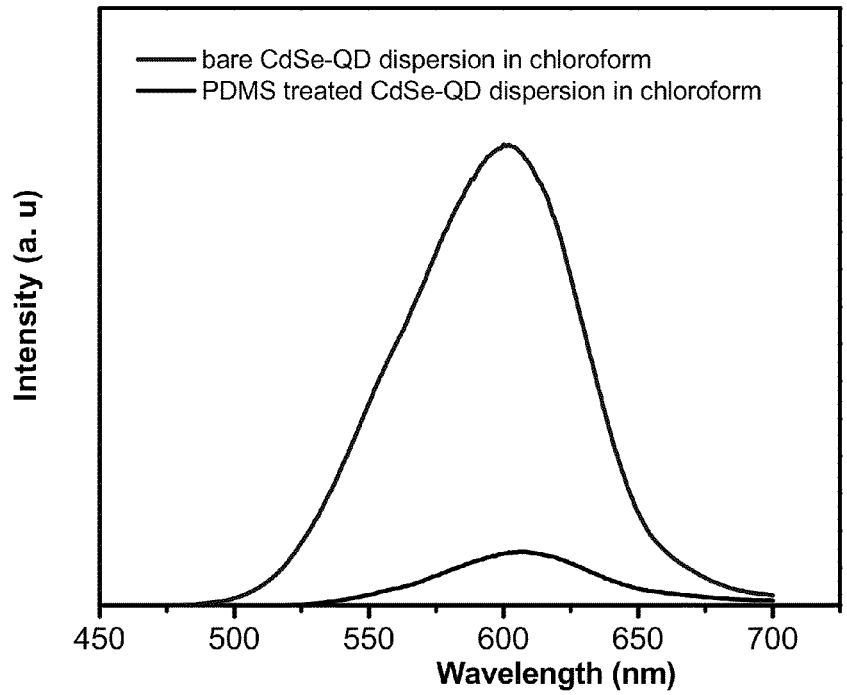
FIG. 9 shows the fluorescence spectra of bare and PDMS modified CdSe-QD dispersion within chloroform showing all the QDs have the same emission peak (excited at 365 nm).

Additionally, it was shown that the presently disclosed processes are also applicable to disperse other functional nanoparticles in silicone. For instance, a nanophosphor material can be dispersed into a silicone matrix to prepare non-scattering light conversion nanocomposites, such as red colored transparent dispersion of synthesized CdSe quantum dots (QDs). The synthesized QD surfaces were weakly bonded with oleic acid, which can be exchanged with a phosphate head group in modified PDMS chains. FIG. 9 shows the fluorescence spectra of the as-synthesized CdSe-QD and PDMS modified CdSe-QD dispersion in chloroform. It can be seen that the surface treatment with PDMS chains does not change the emission wavelength of the light emitting QDs. The relative low fluorescence intensity of PDMS treated CdSe-QD dispersion is probably due to the low concentration used. After surface modification by grafting long and short silicone compatible polymer chains (as shown in FIGS. 3a-3c), the grafted QDs were able to homogeneously mix with silicone and be processed into thick, transparent CdSe-QD/silicone composites.

Figure 10:
FIG. 10 shows a digital photograph of 3 mm thick transparent CdSe-QD/silicone nanocomposites: (a) pure silicone; (b) 0.3 wt % bare CdSe-QD/silicone; (c) 0.3 wt % modified CdSe-QD/silicone; and (d) 0.5 wt % modified CdSe-QD/silicone.
Figure 11:
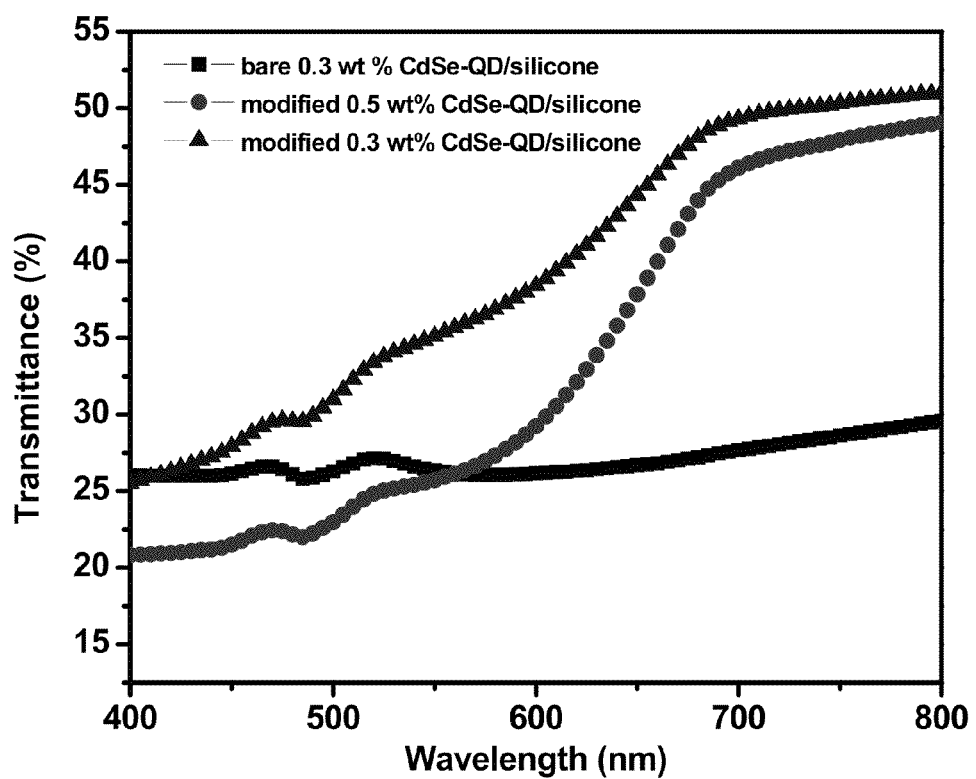
FIG. 11 shows the transmittance spectra of 3 mm thick CdSe-QD/silicone nanocomposites.
Figure 12:
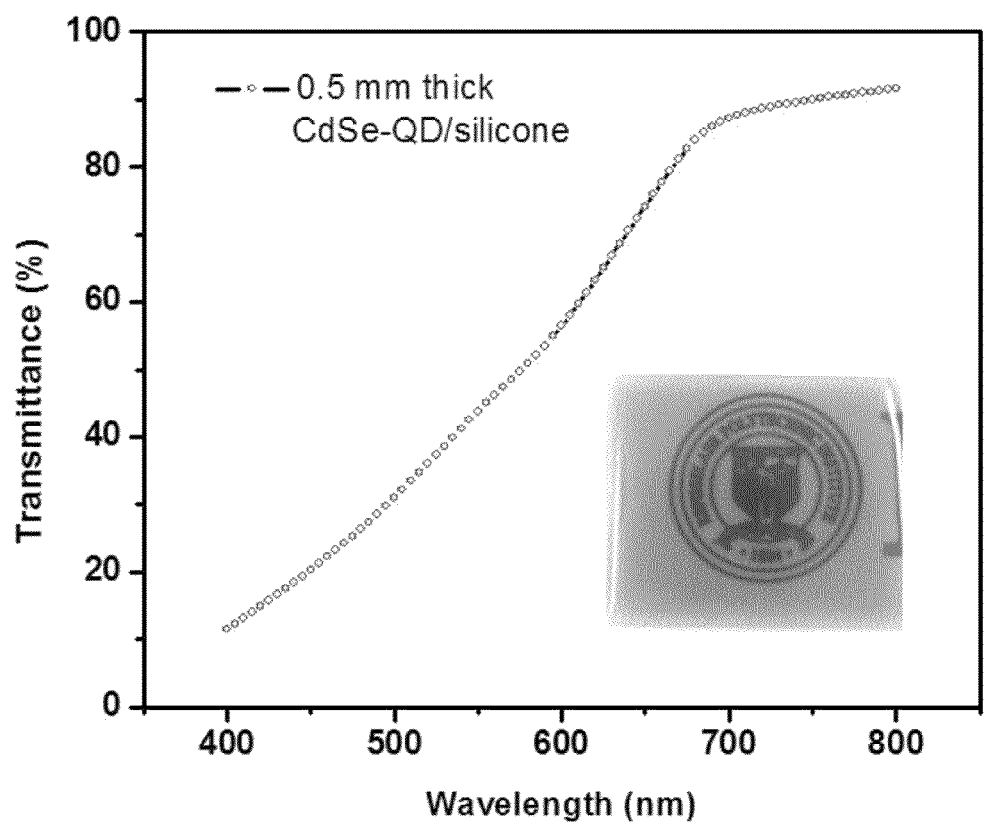
FIG. 12 shows the transmittance spectrum of modified CdSe-QD/silicone nanocomposites with a thickness of 0.5 mm on glass substrate. The inset shows a digital photograph of the prepared highly transparent nanocomposites coated on glass substrate.
Figure 13:
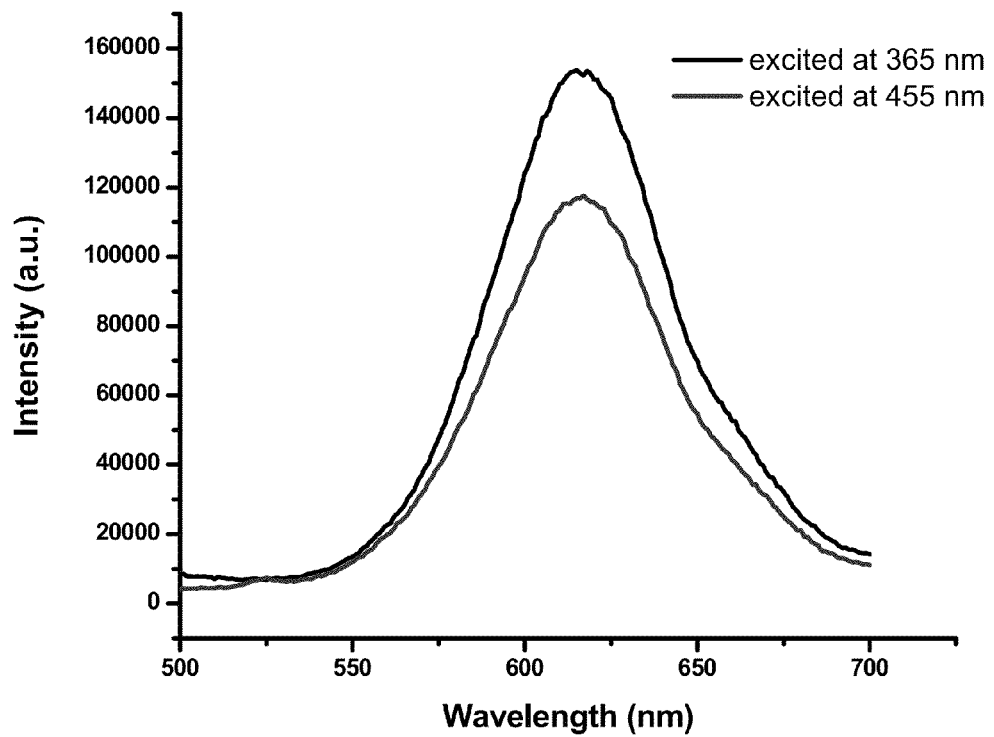
FIG. 13 shows the fluorescence spectra of CdSe-QD/silicone nanocomposite (0.3 wt %, 0.5 mm thick) applied on flat glass substrate excited with different wavelengths.

FIG. 10 demonstrates that 3 mm thick, highly transparent and luminescent CdSe-QD/silicone nanocomposites were successfully prepared with this dispersion technology. Compared with the opaque untreated CdSe-QD/silicone composites, the modified QD/silicone nanocomposites show higher transparencies with the same loading concentration and the high transparency was maintained even after doubling the QD concentration. FIG. 11 compares the transmittance spectra of CdSe-QD/silicone nanocomposites. It can be seen that PDMS chain modified 3 mm thick CdSe-QD/silicone nanocomposites showed a transparency around 50% in the red region (670-800 nm) and increasing loading fraction had little effect on transparency. The CdSe-QD/silicone nanocomposites from this invention started absorbing lower wavelength strongly, meaning the well dispersed QDs were effectively excited. By contrast, the nanocomposite prepared by simply mixing the as-synthesized QDs with silicone showed a transparency of less than 30% and no effective absorption of short wavelength light was observed. FIG. 12 shows the transmittance spectra of the 0.3 wt % CdSe-QD/silicone nanocomposite made from this invention (with a thickness of 0.5 mm) applied on flat glass substrate. The composite showed a transparency over 90% in the red region and a strong absorption of short visible light. FIG. 13 presents the fluorescence spectra of the CdSe-QD/silicone nanocomposite coated on a glass substrate. The composite showed a well-defined emission peak at 620 nm when excited by both the near UV light source at 365 nm and blue light at 455 nm. The high luminescent intensity of the CdSe-QD/silicone nanocomposites developed from this invention could be applied onto light emitting diodes as light conversion phosphor materials. The dispersion technology would also be applicable for dispersing other QDs such as CdSe/CdS, CdTe, InP etc in silicone.

The combination of the highly transparent high refractive index TiO$_2$/silicone nanocomposites and highly transparent and luminescent QD/silicone nanocomposites would enable the production of high efficiency, non-scattering light conversion materials. These materials would have immediate application as advanced LED encapsulation materials with combined advantages such as improved light extraction efficiency from high refractive index feature, increased light conversion efficiency from reduced scattering of phosphor materials and strong absorbance of excited light and higher color rending index from tunable concentration and size of QDs.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A silicone-based nanocomposite comprising a plurality of multimodal nanoparticles dispersed within a silicone-based polymeric matrix, wherein each multimodal nanoparticle comprises a first plurality of long silicone compatible polymeric chains and a second plurality of short silicone compatible polymeric chains grafted onto a surface of a nanoparticle, and wherein the short silicone compatible polymeric chains are present on each multimodal nanoparticle at a higher grafting density than the long silicone compatible polymeric chains.

2. The silicone-based nanocomposite as in claim 1, wherein the multimodal nanoparticles form agglomerations having an average size that is less than about 400 nm.

3. The silicone-based nanocomposite as in claim 1, wherein the multimodal nanoparticles form agglomerations having an average size that is less than about 40 nm.

4. The silicone-based nanocomposite as claim 1, wherein the silicone-based nanocomposite displays a transparency of 90% or more in at least part of the visible spectrum.

5. The silicone-based nanocomposite as claim 1, wherein the short silicone compatible polymeric chains have a molecular weight of about 2,500 g/mol to about 25,000 g/mol.

6. The silicone-based nanocomposite as claim 1, wherein the long silicone compatible polymeric chains have a molecular weight of about 25,000 g/mol to about 250,000 g/mol.

7. The silicone-based nanocomposite as claim 1, wherein the short silicone compatible polymeric chains comprise a polydimethylsiloxane chain covalently linked to the surface of the nanoparticle via a phosphorus linkage.

8. The silicone-based nanocomposite as in claim 7, wherein the phosphorus linkage is a phosphate linkage.

9. The silicone-based nanocomposite as in claim 7, wherein the phosphorus linkage is a phosphono linkage.

10. The silicone-based nanocomposite as in claim 1, wherein the long silicone compatible polymeric chains comprise a polydimethylsiloxane chain covalently linked to the surface of the nanoparticle via a phosphorus linkage.

11. The silicone-based nanocomposite as in claim 1, wherein the nanoparticles comprise inorganic nanoparticles.

12. The silicone-based nanocomposite as in claim 11, wherein the inorganic nanoparticles comprise silica, alumina, titania, indium tin oxide, CdSe, or mixtures thereof.

13. The silicone-based nanocomposite as in claim 1, wherein the long silicone compatible polymeric chains are linked to the surface of the nanoparticle in two locations.

14. The silicone-based nanocomposite as in claim 1, wherein the long silicone compatible polymeric chains define branched polymeric chains.

15. The silicone-based nanocomposite as in claim 1, wherein the long silicone compatible polymeric chains are linked to the surface of the nanoparticle at more than two locations.

16. A method of forming a silicone-based nanocomposite, the method comprising:
dispersing nanoparticles within a solvent containing a surfactant, wherein each nanoparticle defines a surface;
grafting long silicone compatible polymeric chains onto the surfaces of nanoparticles;
grafting short silicone compatible polymeric chains onto the surface of nanoparticles such that each nanoparticle has a first plurality of the long silicone compatible polymeric chains and a second plurality of short silicone compatible polymeric chains grafted onto its surface to form a multimodal nanoparticle, wherein the short silicone compatible polymeric chains are present on each multimodal nanoparticle at a higher grafting density than the long silicone compatible polymeric chains; and dispersing the multimodal nanoparticles within a silicone polymeric matrix to form a silicone-based nanocomposite.

17. The method as in claim 16, wherein the long silicone compatible polymeric chains are grafted onto the surfaces of the nanoparticles prior to the short silicone compatible polymeric chains.

18. The method as in claim 16, wherein the long silicone compatible polymeric chain grafted to the surface of the nanoparticle comprises:

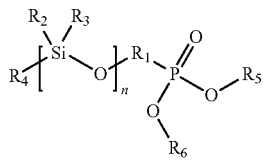

where:
n is greater than about 2,000;
$R_1$ is a covalent bond, an oxygen linkage, an organic linkage, an amine linkage, or a sulfide linkage;
$R_2$ and $R_3$ are, independently, H, an organic group, or an amine group;
$R_4$ is a functional or non-functional end group; and
$R_5$ and $R_6$ are, independently, H or an organic group.

19. The method as in claim 18, wherein the short silicone compatible polymeric chain grafted to the surface of the nanoparticle comprises:

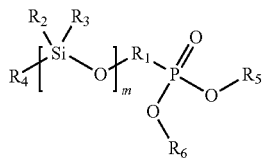

where
m is less than n;
$R_1$ is a covalent bond, an oxygen linkage, an organic linkage, an amine linkage, or a sulfide linkage;
$R_2$ and $R_3$ are, independently, H, an organic group, or an amine group;
$R_4$ is a non-functional end group; and
$R_5$ and $R_6$ are, independently, H or an organic group.

20. The method as in claim 19, wherein $R_4$ is an alkane group.

21. The method as in claim 16, wherein the long silicone compatible polymeric chain grafted to the surface of the nanoparticle comprises:

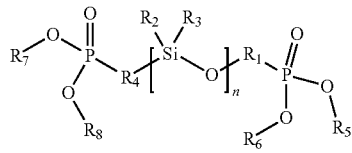

where:
n is greater than about 2,000;
$R_1$ and $R_4$ are, independently, a covalent bond, an oxygen linkage, an organic linkage, an amine linkage, or a sulfide linkage;
$R_2$ and $R_3$ are, independently, H, an organic group, or an amine group; and
$R_5$, $R_6$, $R_7$, and $R_8$ are, independently, H or an organic group.

* * * * *